United States Patent [19]

Blanie

[11] 4,253,983

[45] Mar. 3, 1981

[54] PARAFFIN COMPOSITIONS HAVING IMPROVED HEAT RESERVOIR

[76] Inventor: Marie J. M. P. Blanie, 282, rue Saint-Jacques, 75005 Paris, France

[21] Appl. No.: 887,399

[22] Filed: Mar. 16, 1978

[51] Int. Cl.³ .............................................. C09K 5/06
[52] U.S. Cl. ..................................... 252/70; 126/400; 128/399; 128/402; 585/3; 585/1; 106/285
[58] Field of Search ......................... 252/70; 126/400; 128/82.1, 403, 399, 402, 400

[56] References Cited

U.S. PATENT DOCUMENTS

| 3,075,529 | 1/1963 | Young | 128/403 |
|---|---|---|---|
| 3,356,828 | 12/1967 | Furness | 252/71 X |
| 3,463,140 | 8/1969 | Rollor | 126/400 X |
| 3,463,161 | 8/1969 | Andrassy | 252/70 X |
| 3,603,106 | 9/1971 | Ryan et al. | 126/400 X |
| 3,624,356 | 11/1971 | Havill | 126/400 X |
| 3,823,089 | 7/1974 | Ryan et al. | 252/71 X |
| 3,960,207 | 6/1976 | Boer | 126/400 X |
| 3,986,969 | 10/1976 | Telkes | 252/70 |

Primary Examiner—Harris A. Pitlick
Attorney, Agent, or Firm—Sughrue, Rothwell, Mion, Zinn and Macpeak

[57] ABSTRACT

A paraffin composition that is solid at 25° C. and has an improved heat reservoir by virtue of being combined with inert solid material, wherein the paraffin composition contains from 25 to 55% by weight of at least two constituents comprising aluminium or one of its oxides or silicates, and magnesium or one of its oxides or silicates.

13 Claims, No Drawings

PARAFFIN COMPOSITIONS HAVING IMPROVED HEAT RESERVOIR

The present invention relates to paraffin compositions having improved thermal properties.

For many centuries, paraffins have been known and used on account of their thermal properties. Extracted initially from certain shales, they were first utilised for their relatively low melting point and their long solidification level or plateau, in order either to maintain a constant temperature or to transmit heat while maintaining such temperatures.

The use of paraffins in water-baths, as candles, protective layers on the surfaces of preserved foods, and as thermal lagging, are just some examples of various long established uses.

Paraffins are generally chemically classed as saturated hydrocarbons. Those having low melting points and even low vaporisation points are well-known as fuels (methane, propane and butane in particular); ascending the homologous series, paraffins that are liquid at normal temperature (oils), and then paraffins that are solid at normal temperature (paraffin), are first reached. For example, n-docosane ($C_{22}H_{46}$) melts at 44.4° C. at atmospheric pressure, and n-tetracosane ($C_{24}H_{50}$) at 50.9° C. A fairly extended melting point range can be obtained by choosing a suitable paraffin.

Furthermore, mixtures of paraffins very often have fusion and thus solidification plateaux that are relatively stable, so that it is possible to find a mixture that is suitable for any desired temperature within a desired range of applications.

It is know that when a molten product is cooled, the temperature stabilises throughout the duration of the solidification if the product is pure, though this temperature may vary if the product consists of a mixture.

In fact, this plateau is long and constant for a pure paraffin and is generally slightly "sloping" for a mixture, namely less than 5° C. and more often less than 3° C. between the start and end of solidification for mixtures of paraffins having molecular weights of the same order of magnitude.

The duration of this temperature plateau is due to the large latent heat of fusion which, combined with a relatively low coefficient of heat transmission, is utilised in candles. Taking the above two examples, the latent heat of fusion of n-docosane is 37.6 cal/g, and for n-tetracosane is 38.7 cal/g.

Hereinafter, only paraffins or mixtures of paraffins that are solid at ordinary temperatures, that is to say having a melting point above approximately 25° C., will be considered.

However, although the paraffins have a high heat reservoir on account of the amount of heat liberated on solidification, their coefficient of heat transmission is relatively low, as mentioned above, which is generally an advantage.

Numerous applications involve the concept of "transmission time," by distinguishing on the one hand the case where only the transmission of heat from an external source and the temperature plateau play a role (a water-bath for example), and on the other hand the case where the paraffin is allowed to cool while liberating its heat of solidification without the simultaneous involvement of an external heat source.

In the latter case the question of time is involved, and depending on whether a slow or rapid liberation of heat is desired a greater or lesser thermal conductivity is necessary. It has been suggested, for example in the field of thermal lagging intended for maintaining a body at a certain temperature, to include a certain volcanic muds in the mixtures of paraffins, that will increase the coefficient of heat transmission.

However, the use of these natural products has three major disadvantages, namely the high price due to the problem of supply, variations in their properties that are incompatible with the desired degree of constancy, often essential in numerous practical applications, and a water retention that can be eliminated only above 100° C., all these factors representing major disadvantages both for the products themselves and for the stability of the paraffins and their mixtures.

The present invention provides a paraffin composition that is solid at 25° C. and has an improved heat reservoir by virtue of being combined with inert solid material, wherein the paraffin composition contains from 25 to 55% by weight of at least two constituents comprising aluminium or one of its oxides or silicates, and magnesium or one of its oxides or silicates.

Thus in order to obviate the disadvantages of the prior art, the present invention provides paraffin compositions having an improved heat reservoir and a more easily controlled coefficient of thermal conductivity by adding commonly used products having very stable properties and which are moreover anhydrous, thereby providing various industrial and economic advantages.

Moreover, the choice of suitable composition ensures low prices and a high degree of constancy in the properties, while providing a thereby increased heat reservoir. In addition, by varying certain factors the coefficient of heat transmission and thus the time of the solidification plateau may be regulated.

Under these conditions, if a source of external heat is employed, the thus improved paraffins maintain a very constant temperature while supplying, by transmission, the heat necessary for the desired heating effect, the transmission being regulated depending on the requirements; if on the other hand the heat reservoirs of the paraffins are utilized without using an external source, the heat flux per unit time and consequently the duration of the temperature plateau may be regulated by choosing an appropriate thermal conductivity. In the following description and for the sake of simplicity, the discussion will be restricted to cases where paraffins are employed without an external heat source during use.

It will also be noted that the temperature plateau during solidification increase in duration with the latent heat, and decreases when the coefficient of heat transmission increases.

Moreover, it is clear that the inclusion in the paraffins of chemically inert substances that are solid at the temperatures in question influences the heat reservoir of the whole system, but does not alter that of the paraffins contained in the mixture. It is thus convenient to distinguish between the heat reservoirs per unit mass or volume of the whole mixture, and the heat reservoirs per unit mass or volume of the constituents, and in particular of the paraffins, considered individually.

It will be seen that the present invention enables this heat reservoir of the mixtures to be increased very considerably with respect to that of the prior art.

For the sake of simplicity and by convention, only the heat reservoir corresponding to the temperature plateau, that is to say the heat emitted between the start and end of solidification, will be considered.

In this way, even when considering a mixture of paraffins having a slightly sloping plateau, between two very close end-of range temperatures, the cooling corresponding to inert substances may be practically ignored with respect to the heat reservoir of the paraffins, as is shown by experience (see the following table).

The total heat reservoir in practice thus amounts to that of the paraffins and is generally proportional to the amount of paraffins in the mixture and the latent heat of the paraffins.

In the following description, for the sake of simplicity and by convention, the total volume heat reservoir (RCVT) will denote the amount of heat liberated during solidification of the paraffins per unit volume of the mixture, expressed in Kcal/m$^3$.

If $C_o$ is the latent heat of fusion of a paraffin per unit mass, $\rho_o$ its mass per unit volume, and $V_o$ the amount in volume per unit volume of this paraffin in the total mixture, then the corresponding volume heat reservoir is $C_o\rho_oV_o$.

If the mixture contains several paraffins the total volume heat reservoir may thus be considered as substantially equal to the sum of the volume heat reservoirs corresponding to each component paraffin. In fact, this sum is found in experience to differ little from that of the mixture of paraffins and inert products.

The present invention perferably relates to paraffins having thermal properties that have been improved by incorporating finely divided metals, in particular metals of the second and third groups of Mendeleev's periodic table, their oxides, or their silicates; very good thermal properties have been obtained with amounts by weight of 45 to 75% of paraffins in the total mixture, i.e. with amounts of 25 and 55% of metals or their compounds.

The best results have been obtained with amounts by weight of metals and metal compounds of from 30 to 50%, in particular with the light metals of the aforementioned groups, and their compounds.

Moreover, if it is desired to utilise these mixtures of paraffins to provide thermal lagging or "casings" for therapeutic purposes, the thermal conductivity of the mixture is the basic parameter that has a decisive influence on the heat flow and, consequently, the therapeutic effect.

The paraffin compositions as defined above have in particular the property that they possess a greatly improved heat reservoir and a thermal conductivity that may be selected within a broad range.

The present invention also relates to the therapeutic applications of the paraffin compositions defined above and thermal lagging or casings comprising the previously described paraffin compositions, but whose conductivity and plasticity are determined as a function of their therapeutic application.

In particular, these thermal casings are solid at 40° C., more preferably at 50° C., and comprise 45 to 65% by weight of paraffins and 35 to 55% by weight of fillers comprising metals, their oxides and their silicates.

The paraffins that can be used may be suitably mixtures of n-docosane and n-tetracosane, in amounts respectively of 75 to 85% and 15 to 25%, more preferably 80 to 85% and 15 to 20% by weight.

Moreover, the fillers may comprise a first category of constituents that improve the thermal conductivity of the compositions, such as magnesia, aluminium or alumina, in proportions that may be from 5 to 10%, more preferably from 7 to 9%, by weight.

They may also comprise a second category of constituents that improve the plasticity of the compositions, such as kaolin, magnesia or talc, in proportions that may be from 8 to 15%, more preferably from 10 to 12%, by weight.

The invention will be further described with reference to the following illustrative examples. In particular, reference will be made to the following table showing the mass composition and total volume heat reservoir of mixtures formulated by way of example and numbered 1 to 14.

In all these examples, a paraffin mixture of n-docosane and n-tetracosane in volumetric proportions of 18:82 was used, having a plateau at other temperatures; for other applications, other paraffins would be chosen as a function of their melting points.

The inert substances were added hot in a divided state, with stirring so as to produce a uniform distribution of the inert particles in the mass of paraffins.

In the following examples magnesia, alumina and emery, which is in practice an alumina, were used as oxides, and these various oxides were both anhydrous and pulverulent. Aluminium powder (19 or 22 AFNOR) or aluminium granules was used as metal. Powdered kaolin, that is to say basically aluminium silicates containing some metal oxides, was also used.

The total volume heat reservoirs obtained with these examples ranged from 22.8 to 28.6 Kcal/dm$^3$, which illustrates the improvement that has been achieved.

Furthermore, a conductivity range of 0.32 to 0.48 Kcal/h/m/°C. was observed, whereas the values of known commercial products are approximately 0.45 to 0.55.

TABLE

| EXAMPLES | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PARAFFINS | 65.4 | 65.4 | 67.0 | 70.9 | 67.2 | 61.6 | 65.7 | 47.2 | 47.2 | 54.4 | 53.0 | 53.0 | 46.4 | 44.1 |
| MgO | 9.4 | 9.4 | 9.7 | 10.2 | 9.7 | 8.2 | 8.7 | 6.8 | 6.8 | 7.8 | 3.5 | 3.5 | | |
| Al$_2$O$_3$ | 25.2 | | 23.3 | | | | | 46.0 | | | | | 46.4 | |
| Emery | | 25.2 | | | 23.1 | 30.2 | | | 46.0 | | 37.6 | | | 44.1 |
| Aluminium 19 AFNOR | | | | | | | | | | 37.8 | | | | |
| 22 AFNOR | | | | 18.9 | | | 25.6 | | | | | 37.6 | | |
| Kaolin | | | | | | | | | | | 5.9 | 5.9 | 7.2 | 11.8 |
| Coefficient of thermal conductivity Kcal/h/m/°C. | 0.32 | 0.32 | 0.32 | 0.35 | 0.35 | 0.34 | 0.37 | 0.47 | 0.41 | 0.47 | 0.38 | 0.46 | 0.48 | 0.42 |
| Total volume heat reservoir Kcal/dm$^3$ | 28.6 | 28.6 | 27.7 | 27.3 | 27.3 | 26.6 | 26.6 | 25.5 | 25.5 | 25.5 | 25.0 | 23.8 | 23.6 | 22.8 |

COMPOSITIONS GIVEN IN PERCENT BY WEIGHT

From the table it will be seen that the remarkable results are obtained with amounts by weight of 3 to 11% of magnesia and 23 to 46% of alumina or 18 to 38% of aluminium; in fact, the combination of 2 to 15% of magnesia and 15 to 50% of aluminium or alumina with 45 to 75% of paraffins in practice constitutes an economical and thermally effective range with stable properties.

These combinations have the considerable advantage of exhibiting, in the same volume, a heat reservoir that is improved to an extent of as much as 40%, with a much greater conductivity range, thereby enabling the utilisation time to be prolonged.

As regards the therapeutic applications, examples of thermal casings and their utilisation will now be described, the examples being chosen from a whole series of clinical observations.

In general, the treatments were carried out using the compositions of examples 10, 11 and 12 described above, the compositions having a high thermal conductivity, good plasticity, a melting point of approximately 50° C., and appropriate total volume heat reservoir.

The thermal casings according to the invention are used in the normal manner by melting sufficiently slowly a mass of the paraffin composition and spreading the latter over a plastic or non woven sheet to form a layer approximately 2 cm thick. The mass is allowed to cool until a skin of appearance slightly more mat than that of the mass is formed, and is then applied by surrounding the part to be treated with a thin non woven cloth or preferably a sheet of metallised polyester and varnish, so as to prevent heat losses.

Four main areas of clinical conditions have been treated by means of the casings according to the invention, namely functional re-education (heating and muscular relaxation for active re-education with recovery of joint mobility, for trauma sequelae, or for vasodilatory action applications), in rheumatology (muscular rheumatoid conditions, arthrosis, or polyarthritis), in dermatology (dermatoses, Rynaud's illness, or sclerodermia), and in gastro-enterology (pain syndromes, colopathies, or periviscerites) or as an adjuvant in the treatment of obesity and its syndromes.

In general, the clinical indications for the use of the casings according to the invention are those requiring an excellent localised and profound hyperaemia.

Of the clinical tests that have been carried out on the therapeutic activity of the casings according to the invention, a sample of case histories is given below.

FIRST EXAMPLE: Functional re-education

A fall suffered by a male aged 45 produced a serious trauma in the right knee. X-ray examination did not show any bone lesion. The condition was diagnosed as hydarthrosis, which was initially treated by ultrasound and then by administration of prednisone, but without any marked improvement. The patient complained of serious pain that progressively got worse. There was no restriction in bending movements or abnormal movements, but the pain occurred on walking, at the level of the joint interspacing. Radiography showed femoral condyles with blurred outlines, which were treated with radiotherapy without any noticeable results.

Casings according to the invention were then applied. After five applications the pain diminished but walking was still laboured. After ten further applications, knee flexion became normal, extension was complete, and walking had improved. The treatment was then considered to be complete.

SECOND EXAMPLE: Rheumatology

A woman aged 55 presented a scapulo-humeral periarthrosis with nocturnal cramp exacerbated by lifting movements of the arm. Radiography did not show any bone lesion. A severe limitation in abduction movements and particularly in retropulsion, which was very painful, was observed, as well as intense pain also at the level of humeral head. A low-frequency treatment did not give any results.

A series of five applications of the casings according to the invention followed by massage was prescribed, and a remarkable improvement was found. After a dozen further applications and massage, retropulsion is no longer painful and the condition is considered cured.

THIRD EXAMPLE: Dermatology

A man aged 50 has suffered for five years from a dry palmarplantar psoriasis, which was painful and exhibited chapping and has been treated for 3 years by conventional methods without any marked result.

Casings according to the invention were then applied every other day and a significant improvement was found in the hands after a fortnight, and in the feet after one month. A complete cure was obtained after 3 months, but the applications were continued for a further month to avoid any recurrence of the symptoms.

FOURTH EXAMPLE: Gastro-enterology

A man aged 60 suffered from trouble caused by adhesion following a penetrating wound of the central abdominal wall produced by a bull. Since the accident and after an operation the patient occasionally suffered from severe trouble due to the adhesions, accompanied by a strong feeling of nausea.

The patient was treated with a circular abdominal casing according to the invention for 40 minutes three times a week in order to obtain a humeral reversal and a congestion of the abdominal space. An improvement was obtained from the second casing, and the cure was complete after six treatments.

Furthermore, treatment with localised casings cured cases of gastritis and gastro-intestinal ulcers.

Finally, casings according to the invention have been used as adjuvants in slimming cures, by applying dorsal, circular pelvic and scapula casings to both sides for an average time of 45 minutes, for subjects having a normal circulation. The weight loss results obtained are at least double those obtained with hot water-bath treatments for 45 minutes.

It should be noted that the casings according to the invention do not have any harmful or toxic effect when applied locally, and they may easily be sterilised by raising the temperature to a value below the decomposition temperature of the paraffins, and thus by heating at temperatures of at least 140° C., but they are contraindicated in conventional cases of contra-indication of heat casings, that is to say particularly in cases of circulatory disorder, thrombophlebitis or serious difficulties in sensitisation or sensitiveness.

Of course, the compositions according to the invention may be used prepacked or in combination with one or more active substances or excipients compatible with cutaneous application.

I claim:

1. A paraffin composition that can be used as a shapable heat casing constituent, which is solid at 40° C., and has an improved heat reservoir by virtue of being combined with inert solid material, comprising from 45 to 65% by weight of paraffin and from 35 to 55% by weight of at least two categories of constituents, the first category of constituents improving the thermal conductivity of the composition and being selected from the group consisting of magnesia, aluminum and alumina, and the second category of constituents improving the plasticity of the composition and being selected from the group consisting of kaolin and talc.

2. The composition of claim 1 consisting essentially of said paraffin and said at least two categories of constituents.

3. The composition according to claim 1, containing from 2 to 15% by weight of magnesia.

4. The composition according to claim 1, containing from 15 to 50% by weight of a constituent selected from the group consisting of aluminium and alumina.

5. The composition according to claim 4, containing from 23 to 46% by weight of alumina.

6. The composition according to claim 4, containing from 18 to 38% by weight of aluminium.

7. The composition according to claim 1, containing from 5 to 10% by weight of the first category of constituents.

8. The composition according to claim 7, containing from 7 or 9% by weight of the first category of constituents.

9. The composition according to claim 1, containing from 8 to 15% by weight of kaolin.

10. The composition according to claim 9, containing from 10 to 12% by weight of kaolin.

11. The composition according to claim 1, which is solid at 50° C.

12. The composition according to claim 11, wherein the paraffin is a mixture of n-docosane and n-tetracosane.

13. The composition according to claim 12, wherein the proportion of n-docosane with respect to the total weight of paraffin is from 75 to 85%, and that of n-tetracosane is from 15 to 25%.

* * * * *